(12) United States Patent
Kaupert et al.

(10) Patent No.: US 6,871,790 B2
(45) Date of Patent: Mar. 29, 2005

(54) HEATING SYSTEM FOR A VEHICLE

(75) Inventors: Andreas Kaupert, Ulm (DE); Günter Eberspach, Wolfschlugen (DE)

(73) Assignee: J. Eberspacher GmbH & Co. KG, Esslingen (DE)

( * ) Notice: Subject to any disclaimer, the term of this patent is extended or adjusted under 35 U.S.C. 154(b) by 0 days.

(21) Appl. No.: 10/667,101

(22) Filed: Sep. 20, 2003

(65) Prior Publication Data

US 2004/0115490 A1 Jun. 17, 2004

(30) Foreign Application Priority Data

Sep. 26, 2002 (DE) .......................................... 102 44 883

(51) Int. Cl.[7] .............................................. B60H 1/02
(52) U.S. Cl. .......................... 237/12.3 B; 237/12.3 C; 165/41; 165/42
(58) Field of Search ........................ 237/12.3 C, 12.3 R; 165/41, 42; 180/65.1, 65.2, 65.3, 65.4

(56) References Cited

U.S. PATENT DOCUMENTS

| | | | |
|---|---|---|---|
| 5,316,870 A | * 5/1994 | Ohga | 429/24 |
| 5,753,383 A | 5/1998 | Cargnelli et al. | |
| 6,106,963 A | * 8/2000 | Nitta et al. | 429/19 |
| 6,158,537 A | * 12/2000 | Nonobe | 180/65.3 |
| 6,205,957 B1 | * 3/2001 | Saylor | 123/3 |
| 6,241,875 B1 | * 6/2001 | Gough | 208/106 |
| 6,276,473 B1 | * 8/2001 | Zur Megede | 180/65.2 |
| 6,443,253 B1 | * 9/2002 | Whitehead et al. | 180/68.1 |
| 6,448,535 B1 | * 9/2002 | Ap | 219/208 |
| 6,481,207 B2 | * 11/2002 | Miura et al. | 60/670 |
| 6,497,856 B1 | * 12/2002 | Lomax et al. | 423/651 |
| 6,520,273 B1 | * 2/2003 | Ishikawa | 180/65.3 |
| 6,739,522 B2 | * 5/2004 | Laumen | 239/407 |

FOREIGN PATENT DOCUMENTS

| | | | |
|---|---|---|---|
| DE | 2 016 473 A | 10/1971 | B60H/1/22 |
| DE | 199 39 807 C2 | 3/2001 | F01N/3/08 |
| DE | 100 13 597 A1 | 9/2001 | F01K/25/00 |
| EP | 1 057 780 A2 | 12/2000 | C01B/3/32 |
| EP | 1 179 709 A2 | 2/2002 | F23C/11/00 |
| EP | 1 234 697 A1 | 8/2002 | B60H/1/03 |
| JP | 090 46 802 A | 2/1997 | B60L/1/02 |
| WO | WO 02/40396 A1 | 5/2002 | C01B/3/38 |

* cited by examiner

Primary Examiner—Derek S. Boles

(57) ABSTRACT

A heating system for a vehicle includes a reformer arrangement for producing hydrogen from a hydrocarbon/mixed material mixture, a burner arrangement for reception of hydrogen produced in the reformer arrangement and combustion thereof, and a heat exchanger arrangement for transferring combustion heat produced in the burner arrangement to a heating medium.

5 Claims, 2 Drawing Sheets

HEATING SYSTEM FOR A VEHICLE

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to a heating system for vehicles.

TECHNICAL FIELD

In modern motor vehicles, there is, firstly, on the basis of various technical requirements and, secondly, on the basis of the increased expected comfort, increasingly the need to provide an auxiliary heating system that is able to produce heat essentially independently of the operation of a drive assembly, i.e., for example, an internal combustion engine, through combustion of a fuel/air mixture. All the same, it is also required, for cost reasons, to design vehicles and various systems provided therein as far as possible in such a manner that, by fusing together functions and components, a more favorable system is obtained which, in particular, is also improved in respect to the structural space taken up.

SUMMARY OF THE INVENTION

The object of the present invention is to provide a heating system for a vehicle that realizes efficient heating of various system regions of a vehicle in a structurally simplified manner.

According to the present invention, this object is achieved by a heating system for a vehicle, comprising a reformer arrangement for producing hydrogen from a hydrocarbon/mixed material mixture, a burner arrangement for reception of hydrogen produced in the reformer arrangement and combustion thereof, and a heat exchanger arrangement for transferring combustion heat produced in the burner arrangement to a heating medium.

An essential feature of the present invention is for one system region of a vehicle, namely a reformer arrangement in which hydrogen is provided, for example for operation of a fuel cell, also to form part of a heating system, namely by virtue of the hydrogen that is provided by the reformer arrangement being burned and it being possible to use the combustion heat produced as a result to heat various system regions of the vehicle. To this extent, the auxiliary heating function or additional heater function can therefore be integrated in a reformer system, and it is not necessary to provide a separate auxiliary heating unit.

Since, in the design according to the invention of a heating system, combustion of the hydrogen provided in the reformer arrangement takes place in the burner arrangement, it is advantageous if a flame trap is arranged between the reformer arrangement and a combustion chamber of the burner arrangement. With combustion taking place in the burner arrangement, a spark ignition or reignition in the reformer arrangement is therefore effectively prevented even when these two system regions are situated comparatively close to each other.

According to a further advantageous aspect, feeding means can be provided for feeding hydrogen produced in the reformer arrangement to at least one further hydrogen-consuming system. In this case, the at least one further hydrogen-consuming system, for example, may comprise an exhaust-gas aftertreatment system for an internal combustion engine and/or a fuel cell.

In order to be able to use the reformer arrangement very efficiently in particular when additional hydrogen consumers are provided in a vehicle, it is proposed that the feeding means comprise distributing means for distributing hydrogen produced in the reformer arrangement to the burner arrangement and the at least one further hydrogen-consuming system.

Since, in an arrangement of this type, different hydrogen-consuming system regions are to be activated in different operating phases while other system regions are not to be supplied with hydrogen, provision may furthermore be made for the ratio of distribution of the distributing means to be changeable.

In an alternative embodiment which is structurally very simple to realize and also easy to operate, provision may be made for the feeding means to connect an outlet region of the burner arrangement to the at least one further hydrogen-consuming system.

BRIEF DESCRIPTION OF THE DRAWINGS

The present invention will be described in detail below using preferred embodiments and with reference to the attached drawings, in which.

DETAILED DESCRIPTION OF THE INVENTION

Figure 1:
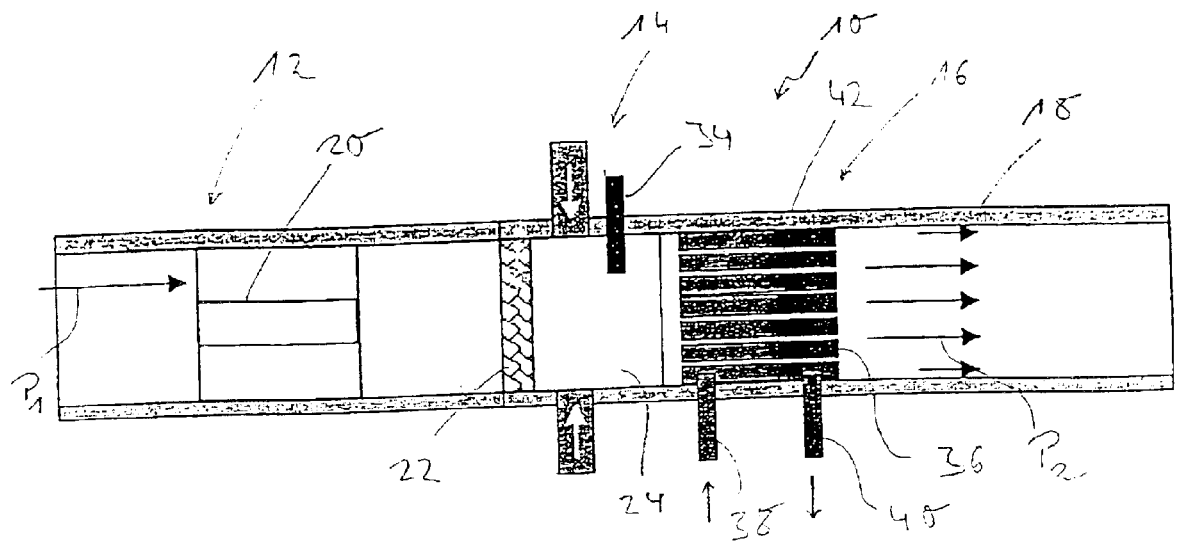
FIG. 1 shows a schematic longitudinal sectional view of a heating system according to the invention.

In FIG. 1, a system according to the invention is referred to in general by 10. This system can essentially be divided into three regions, namely a reformer arrangement 12 situated in the upstream region, a burner arrangement 14 following it downstream, and a heat exchanger arrangement 16 arranged following the burner arrangement 14. In an embodiment which is preferred because of the simple design, all of these system regions 12, 14, 16 can be accommodated in a single, tubular housing region 18.

The reformer arrangement 12 comprises a catalytic converter 20 (illustrated symbolically), in which a mixture, which is symbolized by the arrow $P_1$, of air and hydrocarbon, for example diesel fuel, is decomposed, if appropriate with the addition of water or a pure water/hydrocarbon mixture, so that a gaseous mixture which contains a comparatively high content of hydrogen leaves the reformer arrangement 12. To produce the mixture which is to be decomposed, the reformer arrangement 12 can have an evaporator arrangement which can be preheated or to which starter material which has already been preheated can also be fed to produce the mixture. The catalytic converter 20 can also be assigned a heating device in order to bring it up to the temperature which is required for the catalysis and which lies in the region of 320° C. when diesel fuel is used as the hydrocarbon.

Figure 2:
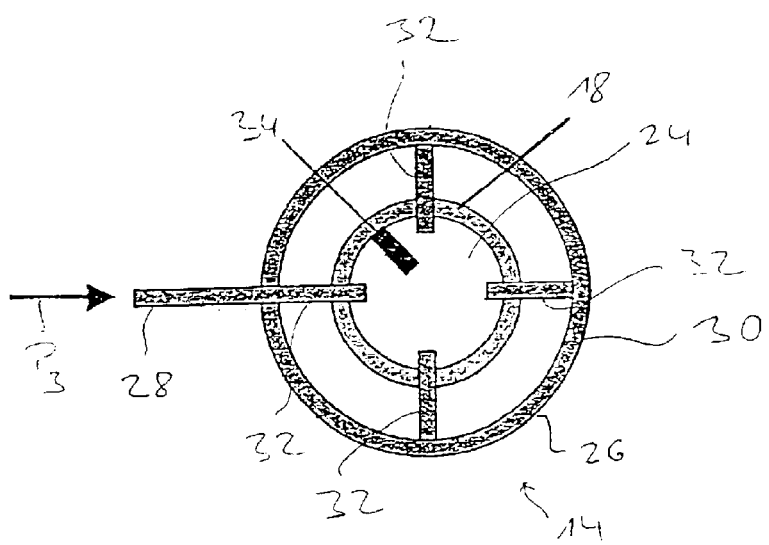
FIG. 2 shows a cross-sectional view of the heating system illustrated in FIG. 1 in the region of the burner arrangement.

The gas leaving the reformer arrangement 12 enters via a flame trap 22 into the burner arrangement 14 and into a combustion chamber 24 thereof. Combustion air is furthermore fed into this combustion chamber 24 via an air-feeding line system 26, which is illustrated in FIG. 2. This air-feeding line system 26 comprises a line region 28 which feeds in air, symbolized by the arrow $P_3$, from the outside, an annular distributing line region 30 and a plurality of air input sections 32 leading into the combustion chamber 24. This results in an input which is as uniform as possible of the air which is to be burned together with the hydrogen passed into the combustion chamber 24. In order to ignite the mixture of air and hydrogen and therefore to trigger the combustion, an ignition element 34 which can have a spiral-type filament or the like can be provided.

The combustion products which are produced in the combustion in the burner arrangement 14 and are generally present in gaseous form transport the heat, which is likewise produced in the combustion, toward the heat exchanger arrangement 16. The latter comprises a heat exchanger body 36 (illustrated only in principle) into which medium, for example air or, if appropriate, also liquid, which is to be heated is fed via an inlet region 38 and from which this medium is drawn off again via an outlet region 40. The combustion products which leave the burner arrangement 14 flow through a plurality of flow ducts 42 leading through the heat exchanger body 36, so that a transfer of heat to the medium which flows through the heat exchanger body 36 and is to be heated can take place. As indicated by the arrows $P_2$, the combustion products and combustion exhaust gases then leave the heat exchanger arrangement 16 and can be fed, for example, into an exhaust-gas system provided in the vehicle or can be made further use of in a manner as still to be described below.

The system that is illustrated in FIGS. 1 and 2 therefore makes it possible to use the hydrogen gas produced in a reformer arrangement 12 as a fuel, by means of combustion, for example in order, in an auxiliary heating mode, to heat air which is to be fed into a vehicle interior, or in order, in a preheating mode for preheating a drive assembly, to heat the cooling medium thereof and therefore to bring the drive assembly up to a temperature suitable for the following operation.

The integration of a system 10 of this type, as is shown in FIGS. 1 and 2, in a vehicle system will be described below with reference to FIG. 3. An internal combustion engine used as drive assembly is referred to there by the reference number 44. The combustion exhaust gases thereof are after-treated in an exhaust-gas after-treatment system 46 in order to reduce the emission of pollutants. Said exhaust-gas after-treatment system generally comprises a catalytic converter (not illustrated).

Figure 3:
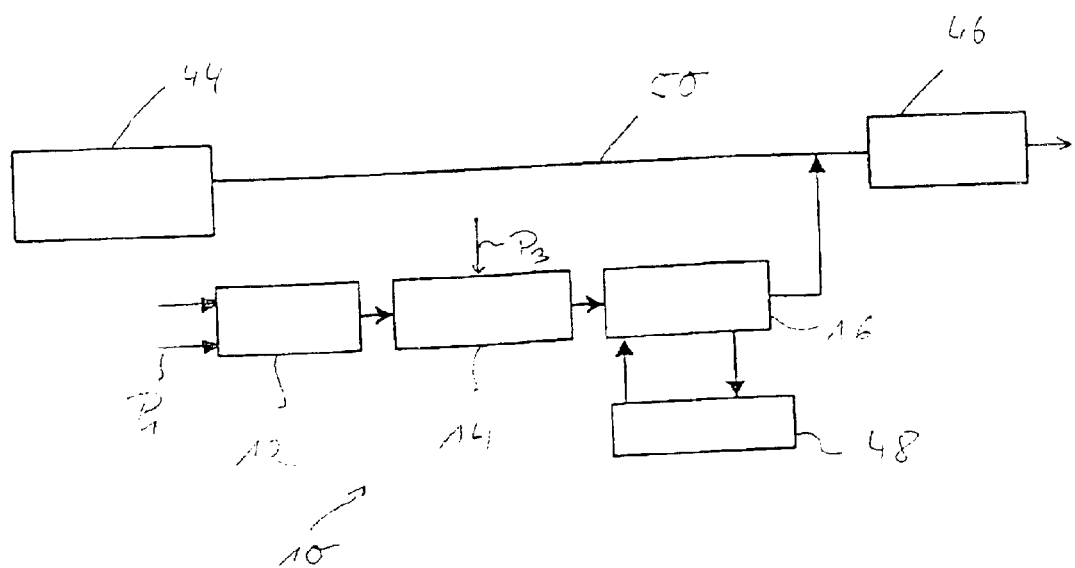
FIG. 3 shows an illustration in the manner of a block diagram of one manner of designing a heating system according to the invention and of integrating it in a vehicle.

FIG. 3 furthermore shows the heating system 10 according to the invention containing the reformer arrangement 12, the burner arrangement 14 and the heat exchanger arrangement 16 following one another in the direction of flow. As again symbolized by the arrows $P_1$, the reformer arrangement 12 receives the mixture of hydrocarbon and further mixed material, for example air and/or water, which is to be decomposed. This mixture is decomposed, as described above, and the hydrogen produced in the process can be burned with air, symbolized by the arrow $P_3$, being added. The heat which is produced in the process is transferred in the heat exchanger arrangement 16 to a medium which then heats a system region 48, which is to be heated, i.e. a vehicle interior, for example. In the combustion mode of the burner arrangement 14, the combustion exhaust gases which leave the heat exchanger arrangement 16 and which will still have a comparatively high temperature particularly if the medium which is to be heated circulates only to a limited extent, if at all, then enter at this high temperature into the exhaust-gas ducting system 50 of the vehicle. These combustion exhaust gases then continue to enter into the exhaust-gas after-treatment system 46 and flow there around the catalytic converter acting to after-treat exhaust gas. In a phase in which the internal combustion engine 44 has not yet been put into operation and therefore the entire exhaust-gas ducting system 50 has a comparatively low temperature, it can therefore be ensured, by preheating the exhaust-gas after-treatment system 46, in particular the catalytic converter, that from the beginning of the operation of the internal combustion engine 44 this exhaust-gas after-treatment system 46 is able in the required manner to convert the exhaust gases emitted by the internal combustion engine 44 and, in particular, to reduce the content of nitrogen oxides.

In order, in an operating phase, in which the internal combustion engine 44 has already been put into operation and to this extent is effective, firstly, as a heat source for heating air which is to be fed into the vehicle interior, but, secondly, the exhaust-gas ducting system 50 and therefore also the exhaust-gas after-treatment system 46 are also kept at the required operating temperature by the combustion exhaust gases of the internal combustion engine 44 that transport a considerable amount of thermal energy, to be able to ensure a further improvement in the emission control, it is possible to operate the heating system 10 according to the invention in such a manner that although the reformer arrangement 12 produces hydrogen, the burner arrangement 14 is deactivated, i.e. the hydrogen fed into it is not burned there and, if appropriate, is also not mixed with additional air. The gases leaving the reformer arrangement 12 and containing a relatively large quantity of hydrogen then flow without further action through the heat exchanger arrangement 16 and pass into the exhaust-gas ducting system 50 and therefore also into the exhaust-gas after-treatment system 46. A considerable quantity of hydrogen is therefore fed into the exhaust gases of the internal combustion engine 44 and, in order to reduce the nitrogen oxide content, can be converted both with $NO_2$ and also with NO in order to produce $N_2$ and $H_2O$.

It can be seen from the preceding description that by dividing up the overall system in the vehicle the heating system 10 according to the invention can be operated in diverse ways and can thus be effective in different operating phases in which there are also different requirements, i.e. the requirement for preheating various system regions, on the one hand, and, if appropriate, the provision of hydrogen for further processing, on the other hand.

Figure 4:
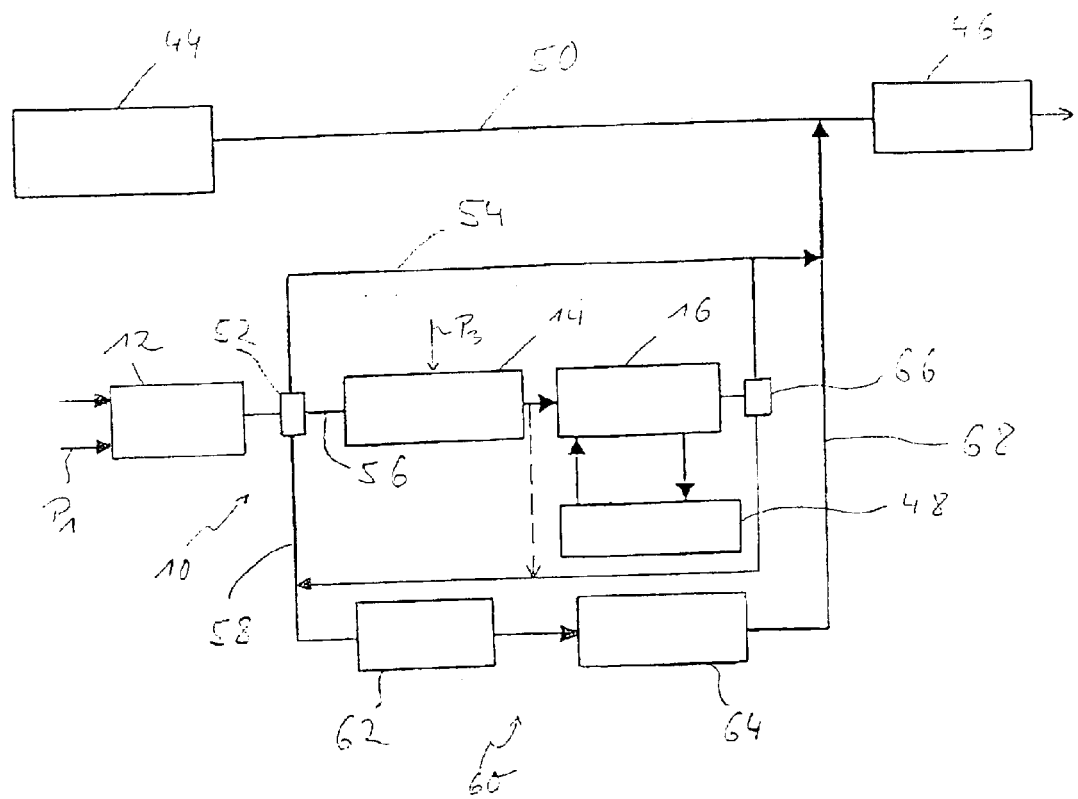
FIG. 4 shows a view corresponding to FIG. 3 of an alternative manner of designing it.

A further overall system, into which the heating system according to the invention can be divided in order to increase the overall functionality, is shown in FIG. 4. The drive assembly 44, the exhaust-gas ducting system 50 thereof and the exhaust-gas after-treatment system 46 can also be seen here again. The heating system 10 is now provided with a valve arrangement 52 between the reformer arrangement 12 and the burner arrangement 14. The gas mixture leaving the reformer arrangement 12 can be fed through this valve arrangement 52 via a line branch 54 directly into the exhaust-gas ducting system 50 of the internal combustion engine 44, can be conducted via a line region 56 to the burner arrangement 14 or can be conducted via a line region 58 to a fuel cell system, which is referred to in general by 60. This fuel cell system 60 can comprise a gas-cleaning system 62 connected upstream of the actual fuel cell 64. Particularly when "low-temperature fuel cells" which operate in a temperature range of approximately 80° C. are used, it is necessary to enrich the gas mixture leaving the reformer arrangement 12 with hydrogen and to reduce the content of carbon monoxide as far as possible. For this purpose, gas-cleaning systems 62 of this type generally likewise have catalytic converters which operate in a temperature range of 200° C. to 500° C. This means that, before the fuel cell 64 is put into operation, at least the gas-cleaning system 62 has to be correspondingly preheated, and preferably the fuel cell 64 itself also has to be brought up to a suitable operating temperature. This can be realized in the system according to the invention, which is illustrated in FIG. 4, as follows:

In a phase before the fuel cell 64 is put into operation, first of all, with the internal combustion engine 64, for example, not activated, the gas mixture leaving the reformer arrangement 12 is conducted through the valve arrangement 52 into the burner arrangement 14 and burned there. These combustion exhaust gases then leave the burner arrangement 14 and, after flowing through the heat exchanger arrangement 16, pass to a further valve arrangement 66 which, in this phase, is switched in such a manner that the combustion exhaust gases of the burner arrangement 14 are fed into the line region 58 upstream of the gas-cleaning system 62. Of course, the heat exchanger arrangement 16 may also be active in this operating phase in order to be effective in an auxiliary heating mode by heating a heating medium, for example air which is to be fed into a vehicle interior. The heated combustion exhaust gases which flow into the line region 58 also flow through the gas-cleaning system 62 and, if appropriate, also the fuel cell 64, in order also to heat them, and then pass via a line region 68, for example, into the exhaust-gas ducting system 50 of the internal combustion engine 44 in order furthermore also to preheat the catalytic converter of the exhaust-gas after-treatment system 46 at least with the residual heat which has remained.

If the gas-cleaning system 62 is at a suitable operating temperature, it can be ensured, by switching over the valve arrangement 52, that at least part of the gas mixture leaving the reformer arrangement 12 now flows into the line region 58 in order therefore to be able to provide, using the gas-cleaning system 62, a gas or gas mixture which is enriched in a suitable manner with hydrogen and is freed from other impurities for the fuel cell 64 and in order to be able to put the fuel cell 64 into operation. In this operating phase, the valve arrangement 66 can furthermore be switched in such a manner that the combustion exhaust gases leaving the burner arrangement 14 and the heat exchanger arrangement 16 flow into the line region 54 leading to the exhaust-gas ducting system 50 of the internal combustion engine 44 and no longer flow into the line region 58 leading to the fuel cell system 60. The fuel cell 64 can then be operated to produce electric energy, for example in order to be able to operate a drive assembly or an auxiliary drive assembly or in order to be able to provide electric energy for the vehicle electric system. In this operating phase, the internal combustion engine 44 can also be operated at the same time, in which case the valve arrangement 52 can then be switched in such a manner that the gas mixture leaving the reformer arrangement 12 is distributed to the two line regions 54 and 58 and gas mixture no longer flows into the line region 56. This has the effect that, firstly, hydrogen is provided for operating the fuel cell 64, and, secondly, hydrogen is available for feeding into the combustion exhaust gases of the internal combustion engine 44 and therefore for improved after-treatment of the same in the exhaust-gas after-treatment system 46. If, in this operating phase, heat is additionally to be provided by the burner arrangement 14, for example in order to fulfill an "additional heater function", then the valve arrangement 52 can be switched in such a manner that hydrogen-containing gas mixture is conducted with the desired ratio of distribution into all three line regions 54, 56, 58.

It is self-evident that various changes to the system shown in FIG. 4 may be undertaken. The combustion exhaust gas leaving the burner arrangement 14 could therefore, as indicated by a broken arrow, be fed directly into the line region 58 by provision of appropriate switching-over means in order to be able to avoid heat losses which may occur in the heat exchanger arrangement 16. The line region 54 could also be omitted, so that if hydrogen is to be fed into the exhaust-gas ducting system 50 of the internal combustion engine 44 for the purpose of improved emission control in the exhaust-gas after-treatment system 46, the valve arrangement 52 is switched in such a manner that at least part of the hydrogen-containing gas mixture flows out of the reformer arrangement 12 into the line region 56, in which, however, the burner arrangement 14 is deactivated at the same time and this gas mixture can therefore pass into the exhaust-gas ducting system 50 by appropriate switching of the valve arrangement 66. It is furthermore possible to heat the gas-cleaning system 62 and/or the fuel cell 64 and/or the catalytic converter 20 of the reformer arrangement 12 using the heat exchanger arrangement 16, i.e., for example in the case of the gas-cleaning system 62, not to have the combustion exhaust gases of the burner arrangement 14 flowing directly through it, but rather to transfer heat to this gas-cleaning system 62 by means of a heating medium circulating between the heat exchanger arrangement 16 and the gas-cleaning system 62. Of course, the same also applies to the other system regions which have been discussed, for example the fuel cell 64.

In place of the valve arrangement 52 which can be seen in FIG. 4 and ensures that a distribution of the gas mixture leaving the reformer arrangement 12 can take place in certain operating phases, in an optimum manner in each case for these operating phases, and therefore that certain line regions can be completely closed, it is basically also possible to provide an arrangement which specifies a fixed ratio of distribution, for example if, in a certain, specified system, the gas quantities which are to be fed into the line region 54 and into the line region 58 are always to be in a certain quantitative proportion to one another. For example, in this case a pipe with a divided cross section can ensure an appropriate ratio of distribution.

According to a further or additional aspect, it is possible, in the systems 10 according to the invention which are illustrated above, not to conduct some or all of the hydrogen-containing gas mixture leaving the reformer arrangement 12 directly to a hydrogen-consuming system, but rather to conduct it into an intermediate store where it can be held under pressure. Thus, for example in the system illustrated in FIG. 3, a store of this type could be positioned between the reformer arrangement 12 and the burner arrangement 14, it then being possible to block off said store toward the reformer arrangement 12 and/or toward the burner arrangement 14 by respective valve arrangements or the like. In the system of FIG. 4, a store of this type could be positioned between the reformer arrangement 12 and the valve arrangement 52. In an arrangement of this type, it is then possible to operate the reformer arrangement 12 irrespective of the actual hydrogen requirement, so that, in phases in which only a small amount of hydrogen is required, if any, the store is charged, and in phases in which more hydrogen is required, the store is discharged. For example, in a phase requiring a very large amount of hydrogen, a hydrogen-consuming system can be fed both from the store and also directly from the reformer arrangement 12. It is thus possible also to feed hydrogen-consuming systems in an operating phase in which, for example, the temperatures required for carrying out the catalytic reaction are not yet present in the reformer arrangement 12. Furthermore, it is possible to operate the reformer arrangement 12 with optimum operating parameters which are independent of the actual hydrogen arrangement, in order to increase the efficiency thereof.

What is claimed is:

1. A heating system for a vehicle, comprising:
   a reformer arrangement (12) for producing hydrogen from a hydrocarbon/mixed material mixture,
   a burner arrangement (14) for reception of hydrogen produced in the reformer arrangement (12) and combustion thereof, and
   a heat exchanger arrangement (16) for transferring combustion heat produced in the burner arrangement (14) to a heating medium,
   wherein hydrogen feeding means (14, 16; 52, 54, 58) are provided for feeding hydrogen produced in the reformer arrangement (12) to at least one further hydrogen-consuming system (46, 60), said at least one further hydrogen-consuming system (46, 60) comprising at least one of an exhaust-gas after-treatment system (46) for an internal combustion engine (44) and of a fuel cell system (60), said hydrogen feeding means (52, 54, 58) comprising hydrogen distributing means (52) for distributing hydrogen produced in the reformer arrangement (12) to the burner arrangement (14) and the at least one further hydrogen-consuming system (46, 60).

2. The heating system as claimed in claim 1, wherein a flame trap (22) is arranged between the reformer arrangement (12) and a combustion chamber (24) of the burner arrangement (14).

3. The heating system as claimed in claim 1, wherein the ratio of distribution of the hydrogen distributing means (52) can be changed.

4. The heating system as claimed in claim 1, wherein the hydrogen feeding means (14, 16) connect an outlet region of the burner arrangement (14) to the at least one further hydrogen-consuming system (46).

5. A heating system for a vehicle, comprising:
   a reformer arrangement (12) for producing hydrogen from a hydrocarbon/mixed material mixture,
   a burner arrangement (14) selectively connectable to the reformer arrangement for reception of hydrogen produced in the reformer arrangement (12) and combustion thereof; and
   a heat exchanger arrangement (16) for transferring combustion heat produced in the burner arrangement (14) to a heating medium, and
   a fuel cell system (60), arranged for receiving hydrogen produced in the reformer arrangement (12) for generating electricity, said burner arrangement (14) or said heat exchanger arrangement (16) being connected or connectable to said fuel cell system (60) for introducing exhaust gases produced in the burner arrangement (14) into the fuel cell system (60).

\* \* \* \* \*